(12) United States Patent
Ono

(10) Patent No.: US 11,321,955 B2
(45) Date of Patent: May 3, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Takanori Ono, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 311 days.

(21) Appl. No.: 16/599,764

(22) Filed: Oct. 11, 2019

(65) Prior Publication Data

US 2020/0410229 A1   Dec. 31, 2020

(30) Foreign Application Priority Data

Jun. 25, 2019   (JP) .............................. JP2019-117614

(51) Int. Cl.
| | |
|---|---|
| *G06V 30/413* | (2022.01) |
| *G06K 9/62* | (2022.01) |
| *G06V 30/412* | (2022.01) |
| *G06V 30/10* | (2022.01) |

(52) U.S. Cl.
CPC ......... *G06V 30/413* (2022.01); *G06K 9/6262* (2013.01); *G06K 9/6267* (2013.01); *G06V 30/412* (2022.01); *G06V 30/10* (2022.01)

(58) Field of Classification Search
CPC ........... G06K 9/00449; G06K 9/00456; G06K 9/6262; G06K 9/6267; G06K 2209/01; G06V 30/10; G06V 30/412; G06V 30/413

USPC ......................................................... 382/224
See application file for complete search history.

(56) References Cited

FOREIGN PATENT DOCUMENTS

| JP | 2000-259847 A | 9/2000 |
| JP | 2003-296661 A | 10/2003 |
| JP | 2003-346080 A | 12/2003 |
| JP | 2016-212812 A | 12/2016 |

OTHER PUBLICATIONS

Aoki, et al. (Computer English Translation of Japanese Patent No. JP2003-346080A), pp. 1-8. (Year: 2003).*
Shunichi, et al. (Computer English Translation of Japanese Patent No. JP2016-212812 A), pp. 1-54 (Year: 2016).*

* cited by examiner

*Primary Examiner* — Daniel G Mariam
(74) *Attorney, Agent, or Firm* — Oliff PLC

(57) ABSTRACT

An information processing apparatus includes a memory and a processor. The processor is connected to the memory and configured to accept input of a threshold of a confidence level indicating how confident a recognition result obtained by recognizing an image is; when the threshold whose input is accepted is applied to an actual data group constituted by one or more pieces of actual data that are recognition results accumulated as actual performance results, classify the actual data group by necessity of validation on the basis of a result of comparison between a confidence level in each of the one or more pieces of actual data in the actual data group and the threshold; and perform control to display classification results obtained by the classification.

14 Claims, 19 Drawing Sheets

FIG. 4

FORM DEFINITION SCREEN

BLANK FORM

| RECOGNITION FRAME INFORMATION | |
|---|---|
| FRAME TYPE | ONE-ROW FRAME TEXT |
| FRAME NAME | RECIPIENT'S NAME |
| FRAME COORDINATES | 350, 502, 626, 121 |
| LEARNED MODEL | NAME |
| TYPE OF CHARACTERS | KANJI, HIRAGANA, KATAKANA |
| CONFIDENCE LEVEL THRESHOLD | 0.7 |
| VALIDATION AND CORRECTION | REQUIRED |
| TYPE OF ENTRY | DOUBLE ENTRY |

FIG. 5

■ EXAMPLE DATA (EXPRESSED IN JSON)

```
[{
    "confidence" : 0.975,
    "correction" : true
},
{
    "confidence" :0.732,
    "correction" : false
},
{
    "confidence" : 0.832,
    "correction" : true
},
...
{
```

FIG. 6

■ CALCULATED THRESHOLDS
- ✓ Threshold 1 : 0.923
- ✓ Threshold 2 : 0.847

■ CLASSIFICATION RESULTS
- ✓ Region 1 (Threshold 1 < confidence)　　　　　　　　　　　: 1 PIECE OF DATA
- ✓ Region 2 (Threshold 2 < confidence ≤ Threshold 1) : 0 PIECES OF DATA
- ✓ Region 3 (confidence ≤ Threshold 2)　　　　　　　　　　　: 2 PIECES OF DATA

FIG. 13

| AUTO CALCULATE | MANUAL INPUT |
|---|---|
| ITEM NAME | VALUE |
| FIELD NAME | NAME 1 |
| FIELD TYPE | CHARACTER STRING |
| NAME OF DICTIONARY | NAME DICTIONARY |
| CONFIDENCE LEVEL THRESHOLD 1 | 1 |
| CONFIDENCE LEVEL THRESHOLD 2 | 1 |
| COORDINATES | xxxx, xxxx, xxxx, xxxx |
| ... | ... |

FIG. 14

CALCULATION OF CONFIDENCE LEVEL THRESHOLD

TARGET INFORMATION FOR CALCULATION OF CONFIDENCE LEVEL THRESHOLD

● USE DEFAULT VALUE
○ SET MANUALLY
　TARGET ACCURACY (0.9 – 0.9999)

AUTO CALCULATE — 64A
MANUAL INPUT — 64B
EXECUTE — 66A
CANCEL — 66B

FIG. 15

CALCULATION OF CONFIDENCE LEVEL THRESHOLD

TARGET INFORMATION FOR CALCULATION OF CONFIDENCE LEVEL THRESHOLD

THRESHOLD 1
● USE DEFAULT VALUE
○ SET MANUALLY ☒
    TARGET ACCURACY (0.9 - 0.9999)

THRESHOLD 2
● USE DEFAULT VALUE
○ SET MANUALLY
    TARGET ACCURACY (0.9 - 0.9999)

⊕ ADD THRESHOLD

EXECUTE   CANCEL
66A       66B

FIG. 16

CALCULATION OF CONFIDENCE LEVEL THRESHOLD

CONFIDENCE LEVEL THRESHOLDS ARE CALCULATED.
PLEASE CHECK THE FOLLOWING INFORMATION AND SELECT WHETHER TO SET THE CALCULATED VALUES IN THE RECOGNITION FRAME.

CONFIDENCE LEVEL THRESHOLD 1: 0.923 — 68A
CONFIDENCE LEVEL THRESHOLD 2: 0.847

CLASSIFICATION RESULTS — 68B

BEFORE APPLICATION
CONFIDENCE LEVEL REGION
[HIGH]: 23 PIECES OF DATA

CONFIDENCE LEVEL REGION
[INTERMEDIATE]: 925 PIECES OF DATA

CONFIDENCE LEVEL REGION
[LOW]: 1971 PIECES OF DATA

AFTER APPLICATION
CONFIDENCE LEVEL REGION
[HIGH]: 421 PIECES OF DATA

CONFIDENCE LEVEL REGION
[INTERMEDIATE]: 1331 PIECES OF DATA

CONFIDENCE LEVEL REGION
[LOW]: 1167 PIECES OF DATA

NUMBER OF PIECES OF DATA REQUIRED TO CALCULATE THE CONFIDENCE LEVEL THRESHOLD SATISFYING THE DESIGNATED TARGET ACCURACY
5000 — 68C
NUMBER OF PIECES OF DATA ACCUMULATED FOR CALCULATION OF CONFIDENCE LEVEL THRESHOLD
2919

⚠ THE NUMBER OF PIECES OF ACTUAL DATA IS LESS THAN THE NUMBER OF PIECES OF DATA REQUIRED TO — 68D
CALCULATE THE CONFIDENCE LEVEL THRESHOLD SATISFYING THE DESIGNATED TARGET ACCURACY.
IF THE NUMBER OF PIECES OF DATA IS NOT SUFFICIENT, THE EXPECTED EFFECT WILL NOT BE ACHIEVED.

SET — 68E
NOT SET — 68F

FIG. 17

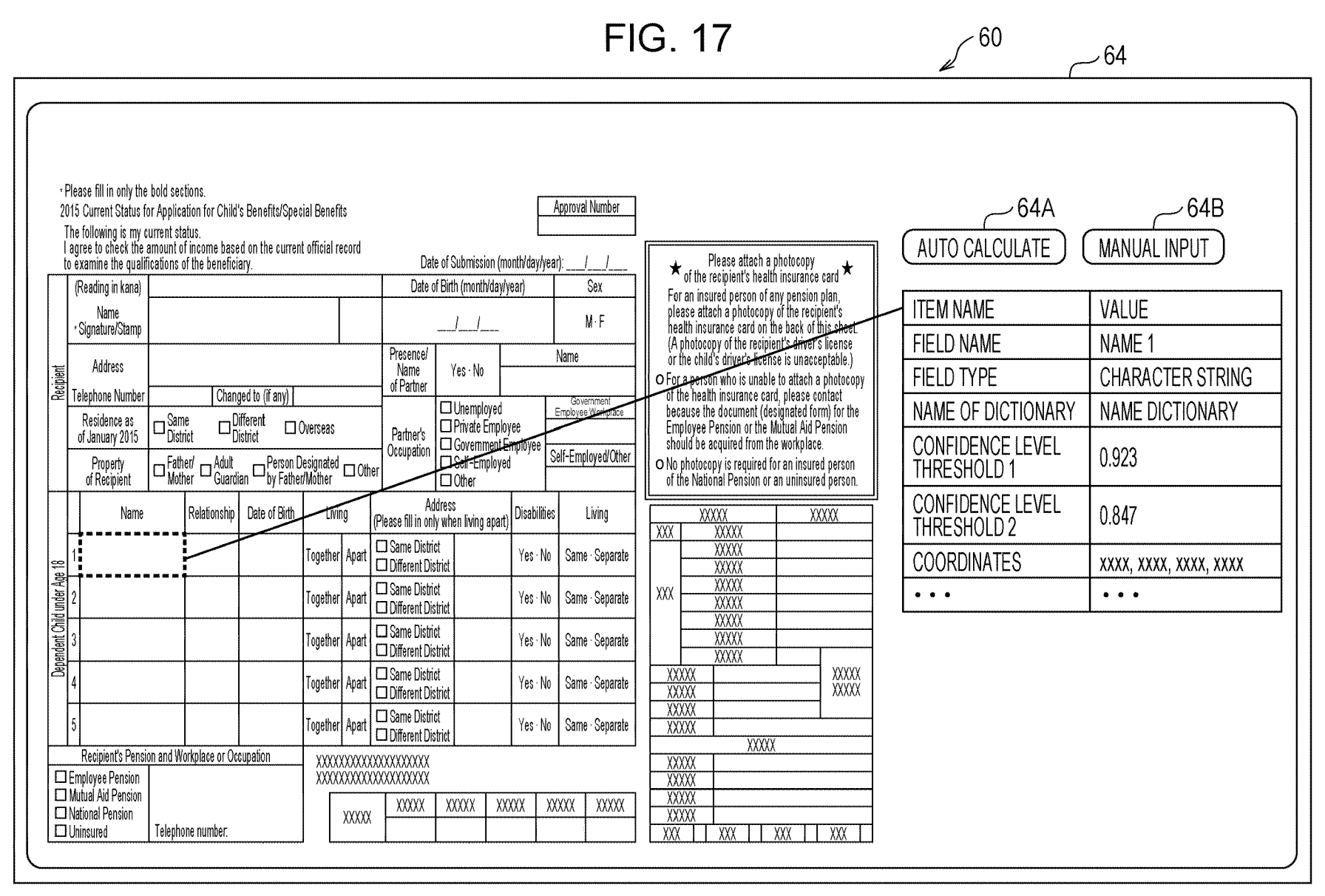

| AUTO CALCULATE | MANUAL INPUT |
|---|---|
| ITEM NAME | VALUE |
| FIELD NAME | NAME 1 |
| FIELD TYPE | CHARACTER STRING |
| NAME OF DICTIONARY | NAME DICTIONARY |
| CONFIDENCE LEVEL THRESHOLD 1 | 0.923 |
| CONFIDENCE LEVEL THRESHOLD 2 | 0.847 |
| COORDINATES | xxxx, xxxx, xxxx, xxxx |
| ... | ... |

FIG. 19

CALCULATION OF CONFIDENCE LEVEL THRESHOLD

CONFIDENCE LEVEL THRESHOLDS ARE CALCULATED.
PLEASE CHECK THE FOLLOWING INFORMATION AND SELECT WHETHER TO SET THE CALCULATED VALUES IN THE RECOGNITION FRAME.

CONFIDENCE LEVEL THRESHOLD 1: 0.923 — 68A
CONFIDENCE LEVEL THRESHOLD 2: 0.847

CLASSIFICATION RESULTS — 68B

BEFORE APPLICATION
CONFIDENCE LEVEL REGION
[HIGH]: 23 PIECES OF DATA

CONFIDENCE LEVEL REGION
[INTERMEDIATE]: 925 PIECES OF DATA

CONFIDENCE LEVEL REGION
[LOW]: 1971 PIECES OF DATA

AFTER APPLICATION
CONFIDENCE LEVEL REGION
[HIGH]: 421 PIECES OF DATA

CONFIDENCE LEVEL REGION
[INTERMEDIATE]: 1331 PIECES OF DATA

CONFIDENCE LEVEL REGION
[LOW]: 1167 PIECES OF DATA

MAN-HOUR REDUCTION RATE:
25% — 68I

NUMBER OF PIECES OF DATA REQUIRED TO CALCULATE THE CONFIDENCE LEVEL THRESHOLD SATISFYING THE DESIGNATED TARGET ACCURACY — 68C
5000
NUMBER OF PIECES OF DATA ACCUMULATED FOR CALCULATION OF CONFIDENCE LEVEL THRESHOLD
2919

⚠ THE NUMBER OF PIECES OF ACTUAL DATA IS LESS THAN THE NUMBER OF PIECES OF DATA REQUIRED TO — 68D
CALCULATE THE CONFIDENCE LEVEL THRESHOLD SATISFYING THE DESIGNATED TARGET ACCURACY.
IF THE NUMBER OF PIECES OF DATA IS NOT SUFFICIENT, THE EXPECTED EFFECT WILL NOT BE ACHIEVED.

SET — 68E      NOT SET — 68F

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-117614 filed Jun. 25, 2019.

BACKGROUND

(i) Technical Field

The present disclosure relates to an information processing apparatus and a non-transitory computer readable medium.

(ii) Related Art

For example, Japanese Unexamined Patent Application Publication No. 2016-212812 describes an information processing apparatus that can reduce man-hours involved in manually inputting an object to be subjected to character recognition. The information processing apparatus includes classification means for classifying the object to be subjected to character recognition into any one of three types, and extraction means for extracting a character recognition result of the object to be subjected to character recognition when the classification means classifies the object to be subjected to character recognition into a first type. The information processing apparatus further includes first control means and second control means. When the classification means classifies the object to be subjected to character recognition into a second type, the first control means performs control to extract a character recognition result of the object to be subjected to character recognition and to make a person manually input the object to be subjected to character recognition. When the classification means classifies the object to be subjected to character recognition into a third type, the second control means performs control to make a plurality of people manually input the object to be subjected to character recognition.

Japanese Unexamined Patent Application Publication No. 2003-346080 describes a character recognition method that can improve overall processing capabilities by utilizing character recognition results of input images and the associated confidence level values. The character recognition method includes a first step of inputting an image on a form filled out with characters, and a second step of performing character recognition on the image input in the first step to obtain a degree of similarity as a character recognition result. The character recognition method further includes a third step of comparing the degree of similarity obtained in the second step with a pre-registered confidence level required for the character recognition, and a fourth step of, based on a result of the comparison performed in the third step, performing any one of output that requires no manual verification for the character recognition result, output that promotes manual verification by presenting possible character recognition options for the character recognition result, or output that promotes manual input processing by presenting new manual input and manual confirmation for the character recognition result.

Japanese Unexamined Patent Application Publication No. 2003-296661 describes a character recognition apparatus capable of relatively accurately calculating reliability even when it is difficult to correctly estimate the reliability of a recognition result only by using features obtained from the character recognition result, and improving recognition accuracy. The character recognition apparatus includes character recognition means for recognizing a coordinate point sequence of a character input by handwriting and outputting recognized candidate characters, and feature extraction means for calculating an average writing speed for the coordinate point sequence of the character input by handwriting, as a feature value for calculating reliabilities of the recognized candidate characters to be determined, which are output from the character recognition means. The character recognition apparatus further includes reliability calculation means for calculating the reliabilities of the recognized candidate characters to be determined, on the basis of the feature value provided from the feature extraction means and the statistical tendency of sample data, and post-processing control means for controlling post-processing operations of the recognized candidate characters to be determined, on the basis of the reliabilities provided from the reliability calculation means.

Japanese Unexamined Patent Application Publication No. 2000-259847 describes an information search method for extracting a logic element from a document image and displaying the extracted logic element. The information search method includes performing character recognition on a character region corresponding to the extracted logic element, displaying the character region as a character code when the confidence level of the recognition result is greater than or equal to a predetermined threshold, and displaying the character region as a partial image when the confidence level of the recognition result is less than the threshold.

SUMMARY

In a system, a recognition result obtained by recognizing an image of a document such as a form is manually validated when the recognition result has a confidence level less than a threshold, or is output as a final recognition result without manual validation when the recognition result has a confidence level greater than or equal to the threshold. In the system, setting of a new threshold makes it difficult to determine in advance the effect of the new set threshold on the validation operation.

Aspects of non-limiting embodiments of the present disclosure relate to an information processing apparatus and a non-transitory computer readable medium that enable a user to, when setting a confidence level threshold for recognition results, easily determine the effect of a new threshold on validation of an actual data group of the recognition results, compared with a case where no consideration is given of the effect of a new threshold on validation of the actual data group.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a memory and a processor. The processor is connected to the memory and configured to accept input of a threshold of a confidence level indicating how confident a recognition result obtained by recognizing an image is, when the threshold whose input is accepted is applied to an actual data group constituted by one or more pieces of actual data that are recognition results accumulated as actual performance results, classify the actual data group by necessity of validation on the basis of a result of comparison between a confidence level in each of the one or more pieces of actual data in the actual data group and the threshold, and perform control to display classification results obtained by the classification.

BRIEF DESCRIPTION OF THE DRAWINGS

An exemplary embodiment of the present disclosure will be described in detail based on the following figures, wherein:

FIG. 4 is a front view illustrating an example of a form definition screen according to the exemplary embodiment;

FIG. 5 illustrates an example of an actual data group according to the exemplary embodiment;

FIG. 6 illustrates an example of confidence level thresholds and classification results according to the exemplary embodiment;

FIG. 13 is a front view illustrating an example of a confidence level threshold setting screen according to the exemplary embodiment;

FIG. 14 is a front view illustrating an example of a target accuracy setting dialog according to the exemplary embodiment;

FIG. 15 is a front view illustrating another example of the target accuracy setting dialog according to the exemplary embodiment;

FIG. 16 is a front view illustrating an example of a confidence level threshold calculation result validation dialog according to the exemplary embodiment;

FIG. 17 is a front view illustrating another example of the confidence level threshold setting screen according to the exemplary embodiment;

FIG. 19 is a front view illustrating still another example of the confidence level threshold calculation result validation dialog according to the exemplary embodiment.

DETAILED DESCRIPTION

The following describes an exemplary embodiment of the present disclosure in detail with reference to the drawings.

Figure 1:
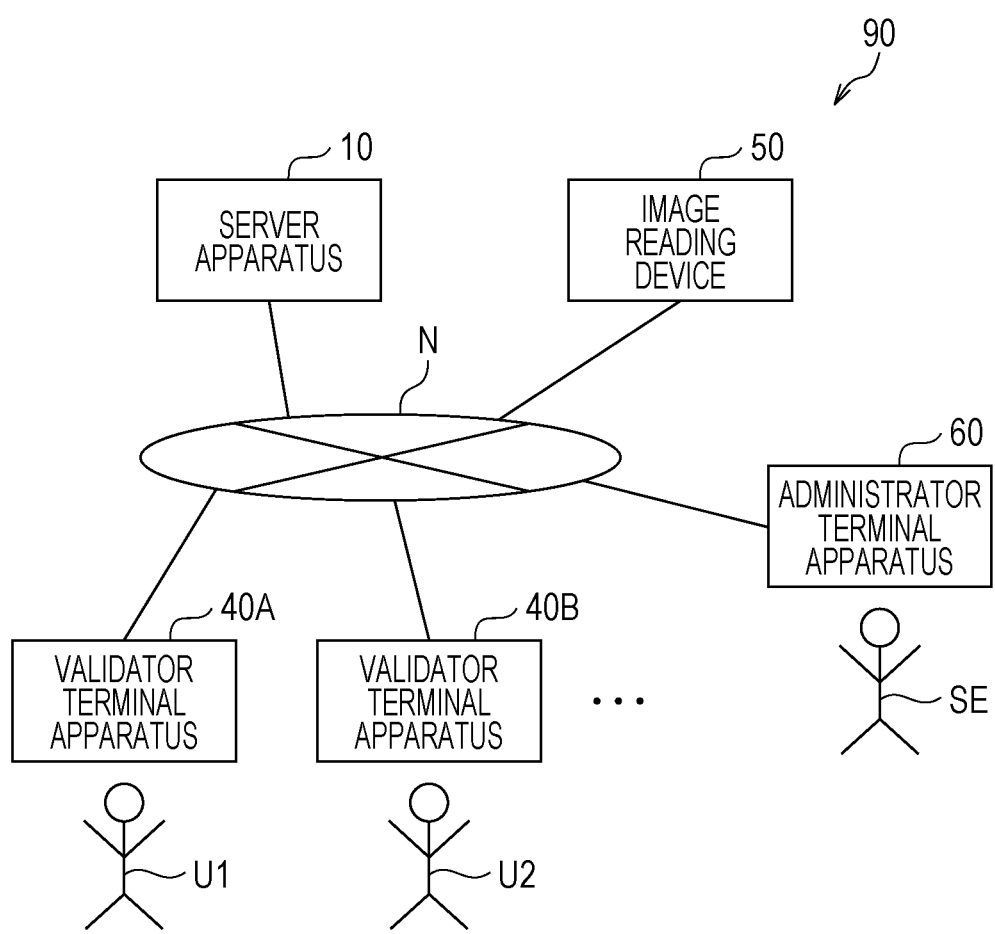
FIG. 1 illustrates an example configuration of an information processing system according to an exemplary embodiment.

FIG. 1 illustrates an example configuration of an information processing system 90 according to this exemplary embodiment.

As illustrated in FIG. 1, the information processing system 90 according to this exemplary embodiment includes a server apparatus 10, validator terminal apparatuses 40A, 40B, etc., an image reading device 50, and an administrator terminal apparatus 60. The server apparatus 10 is an example of an information processing apparatus.

The server apparatus 10 is connected so as to be capable of communicating with the validator terminal apparatuses 40A, 40B, etc., the image reading device 50, and the administrator terminal apparatus 60 via a network N. Examples of the server apparatus 10 include a server computer and a general-purpose computer such as a personal computer (PC). Examples of the network N include the Internet, a local area network (LAN), and a wide area network (WAN).

The image reading device 50 has a function of optically reading a document such as a paper form to obtain an image and transmitting the obtained image (hereinafter referred to as the "form image") to the server apparatus 10. The term "form", as used herein, refers to any of various document forms containing a plurality of fields of items such as name and address fields. In the form, each of the plurality of fields of items is filled out with handwritten characters, printed characters, or the like. Specifically, as described below, the server apparatus 10 performs optical character recognition (OCR) processing on the form image received from the image reading device 50 and acquires a recognition result of an image corresponding to each of the plurality of fields of items. Examples of the recognition result include a character string indicating a sequence of characters containing one or more letters and numbers. In the form, areas to be filled in, which correspond to the fields of items, are bounded by frames or the like, and the areas to be filled in are defined as areas to be subjected to recognition. OCR processing is performed on the defined areas to acquire character strings for the respective images corresponding to the plurality of fields of items.

The validator terminal apparatus 40A is a terminal apparatus operated by a validator (user) U1 who performs a validation operation, and the validator terminal apparatus 40B is a terminal apparatus operated by a validator U2 who performs a validation operation. The validator terminal apparatuses 40A, 40B, etc. are also referred to collectively as validator terminal apparatuses 40 or individually as validator terminal apparatus 40 unless the validator terminal apparatuses 40A, 40B, etc. need be distinguished from each other. Also, the validators U1, U2, etc. are referred to collectively as validators U or individually as validator U unless the validators U1, U2, etc. need be distinguished from each other. Examples of the validator terminal apparatus 40 include a general-purpose computer such as a PC and a portable terminal apparatus such as a smartphone and a tablet terminal. The validator terminal apparatus 40 has installed therein a validation application program (hereinafter referred to also as "validation application") for allowing the validator U to perform a validation operation. The validator terminal apparatus 40 generates and displays a validation operation user interface (UI) screen. The term "validation" or "validation operation", as used herein, refers to an operation of validating (and correcting, if any) a recognition result of characters or the like in the form image.

The administrator terminal apparatus 60 is a terminal apparatus operated by a system administrator SE. The system administrator SE configures form definition data through a form definition screen described below. Examples of the administrator terminal apparatus 60 include a general-purpose computer such as a PC and a portable terminal apparatus such as a smartphone and a tablet terminal.

The form image includes sub-images of fields of items (hereinafter referred to as "item images"), and each of the item images is recognized to obtain a recognition result. If the recognition result has a confidence level less than a threshold, the server apparatus 10 makes a person manually validate the recognition result. If the recognition result has a confidence level greater than or equal to the threshold, the server apparatus 10 outputs the recognition result as a final recognition result without performing any manual validation operation.

To perform the validation operation described above, the server apparatus 10 performs control to display each of the item images and a character string obtained by OCR processing on the UI screen of the validator terminal apparatus 40 in association with each other. The validator U views each of the item images and validates whether the character string corresponding to the item image is correct. As a result of the validation, if the character string is correct, the validator U performs no operation, and if the character string is not correct, the validator U inputs a correct character string on the UI screen. The validator terminal apparatus 40 transmits the character string whose input is accepted through the UI screen to the server apparatus 10 as a validation result. The server apparatus 10 outputs a final recognition result based on the validation result from the validator terminal apparatus 40, and performs control to display the final recognition result on the UI screen of the validator terminal apparatus 40.

Figure 2:
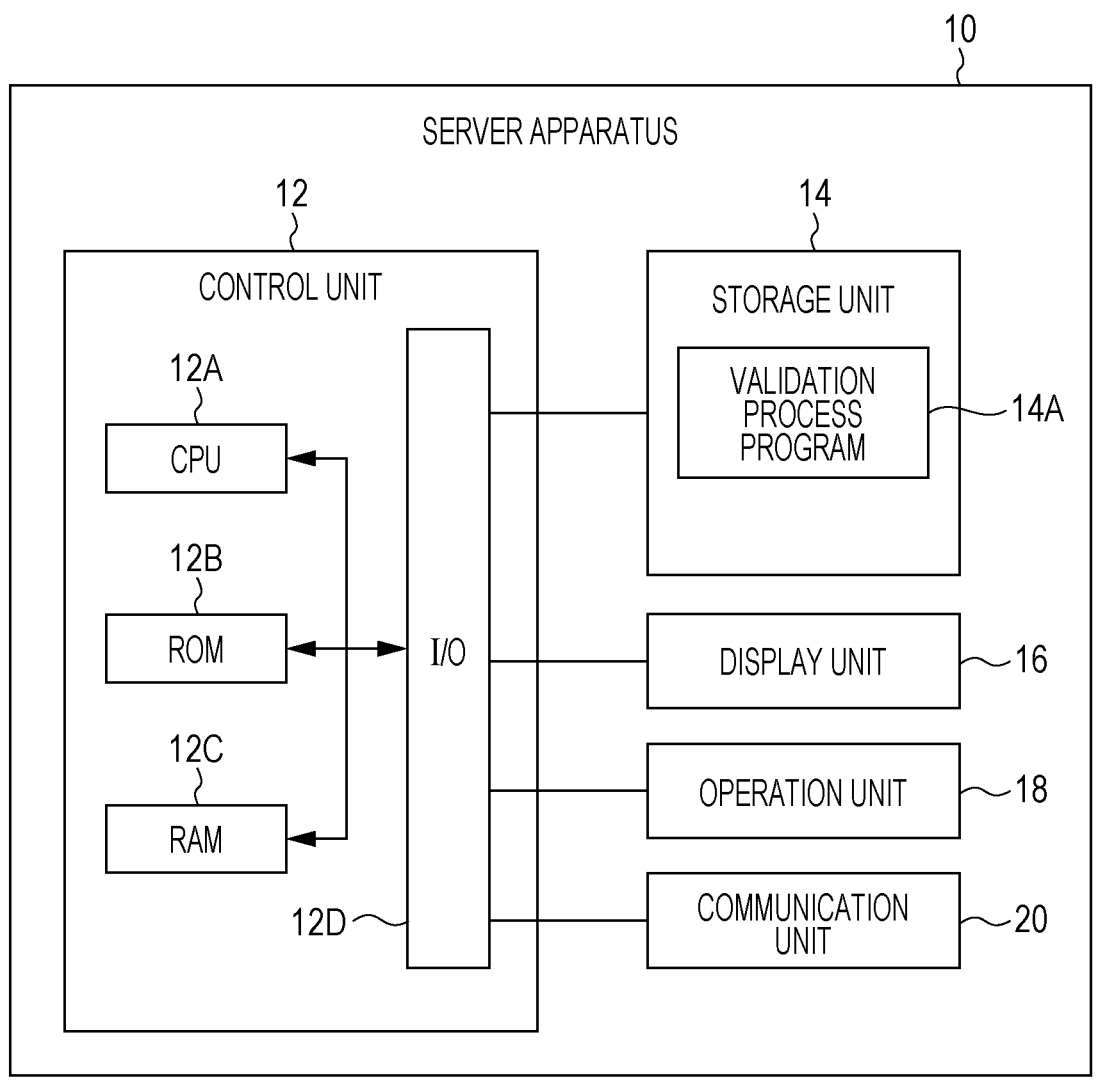
FIG. 2 is a block diagram illustrating an example electrical configuration of a server apparatus according to the exemplary embodiment.

FIG. 2 is a block diagram illustrating an example electrical configuration of the server apparatus 10 according to this exemplary embodiment.

As illustrated in FIG. 2, the server apparatus 10 according to this exemplary embodiment includes a control unit 12, a storage unit 14, a display unit 16, an operation unit 18, and a communication unit 20.

The control unit 12 includes a central processing unit (CPU) 12A, a read only memory (ROM) 12B, a random access memory (RAM) 12C, and an input/output interface (I/O) 12D. The CPU 12A, the ROM 12B, the RAM 12C, and the I/O 12D are interconnected via a bus.

The I/O 12D is connected to functional units including the storage unit 14, the display unit 16, the operation unit 18, and the communication unit 20. Each of the functional units is capable of communicating with the CPU 12A via the I/O 12D.

The control unit 12 may be configured as a sub-control unit that controls part of the operation of the server apparatus 10, or may be configured as a main control unit that controls the overall operation of the server apparatus 10. Some or all of the blocks of the control unit 12 are implemented using, for example, an integrated circuit (IC) such as a large scale integrated (LSI) circuit or an IC chip set. Each of the blocks may be implemented as a single separate circuit, or some or all of the blocks may be integrated on a circuit. Alternatively, the blocks may be formed into a single unit, or some of the blocks may be separately disposed. Alternatively, in each of the blocks, a portion thereof may be separately disposed. The control unit 12 may be integrated by using a dedicated circuit or a general-purpose processor instead of by using an LSI circuit.

Examples of the storage unit 14 include a hard disk drive (HDD), a solid state drive (SSD), and a flash memory. The storage unit 14 stores a validation process program 14A for performing a form validation process according to this exemplary embodiment. The validation process program 14A may be stored in the ROM 12B.

The validation process program 14A may be installed in the server apparatus 10 in advance, for example. The validation process program 14A may be implemented as follows. The validation process program 14A may be stored in a non-volatile storage medium or distributed via the network N and installed in the server apparatus 10, if necessary. Possible examples of the non-volatile storage medium include a compact disc read only memory (CD-ROM), a magneto-optical disk, an HDD, a digital versatile disc read only memory (DVD-ROM), a flash memory, and a memory card.

Examples of the display unit 16 include a liquid crystal display (LCD) and an organic electroluminescent (EL) display. The display unit 16 may have a touch panel integrated therein. The operation unit 18 is provided with an operation input device such as a keyboard and a mouse. The display unit 16 and the operation unit 18 accept various instructions from the user of the server apparatus 10. The display unit 16 displays various types of information, examples of which include results of a process executed in accordance with an instruction accepted from the user, and a notification about the process.

The communication unit 20 is connected to the network N, such as the Internet, a LAN, or a WAN, and is allowed to communicate with each of the image reading device 50, the validator terminal apparatus 40, and the administrator terminal apparatus 60 via the network N.

As described above, setting of a new threshold for the confidence level of recognition results makes it difficult to determine in advance the effect of the new set threshold on the validation operation.

Figure 3:
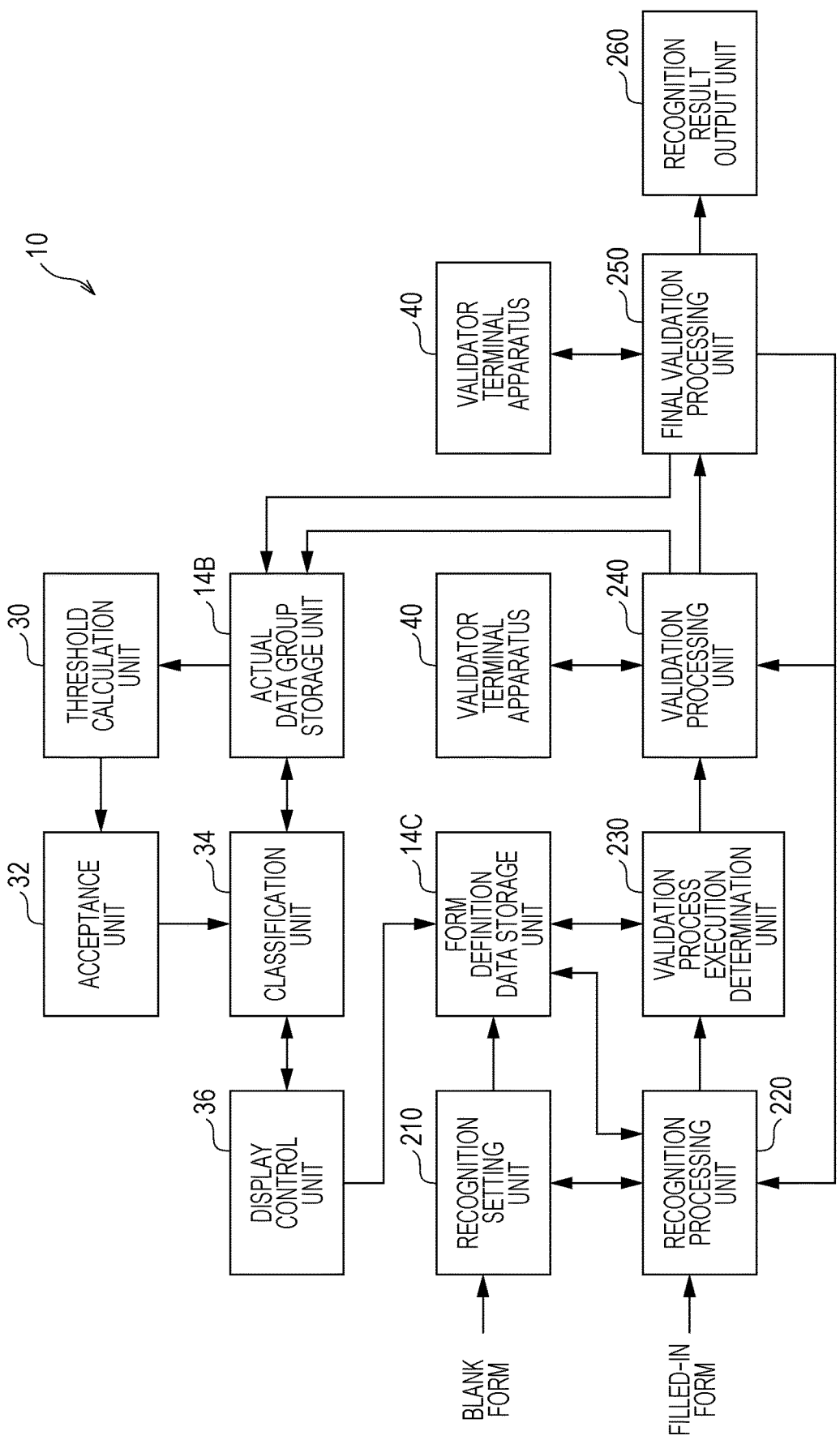
FIG. 3 is a block diagram illustrating an example functional configuration of the server apparatus according to the exemplary embodiment.

Accordingly, the CPU 12A of the server apparatus 10 according to this exemplary embodiment loads the validation process program 14A stored in the storage unit 14 into the RAM 12C and executes the validation process program 14A, thereby functioning as the components illustrated in FIG. 3. The CPU 12A is an example of a processor.

FIG. 3 is a block diagram illustrating an example functional configuration of the server apparatus 10 according to this exemplary embodiment. In this exemplary embodiment, a form image is used as the image to be subjected to recognition, by way of example but not limitation. Alternatively, a read image of any typical document may be subjected to recognition.

As illustrated in FIG. 3, the CPU 12A of the server apparatus 10 according to this exemplary embodiment functions as a threshold calculation unit 30, an acceptance unit 32, a classification unit 34, and a display control unit 36. The CPU 12A of the server apparatus 10 also functions as a recognition setting unit 210, a recognition processing unit 220, a validation process execution determination unit 230, a validation processing unit 240, a final validation processing unit 250, and a recognition result output unit 260.

The storage unit 14 according to this exemplary embodiment includes an actual data group storage unit 14B that stores an actual data group constituted by pieces of actual data, and a form definition data storage unit 14C that stores form definition data. The pieces of actual data in the actual data group indicate recognition results accumulated as actual performance results.

The recognition setting unit 210 receives input of a form image of a blank form and performs recognition setting. By way of example, the recognition setting unit 210 causes the administrator terminal apparatus 60 to display a form definition screen 62 illustrated in FIG. 4, and accepts input of form definition data.

FIG. 4 is a front view illustrating an example of the form definition screen 62 according to this exemplary embodiment.

The form definition screen 62 illustrated in FIG. 4 is a screen displayed on the administrator terminal apparatus 60 for accepting input of form definition data by the system administrator SE.

The form definition screen 62 illustrated in FIG. 4 includes a preview image of a blank form, and recognition frame information indicating form definition data. The recognition frame information includes, by way of example, a frame type, a frame name, frame coordinates, a learned model, a type of characters, a confidence level threshold, validation and correction, and a type of entry, and the content of the respective settings is stored in the form definition data storage unit 14C. The learned model indicates a recognition dictionary. In the example illustrated in FIG. 4, information concerning the "recipient's name" is displayed. The confidence level is a measure of how confident the recognition result is. The higher the value of the confidence level, the higher the probability of matching between the item image and the recognition result. The confidence level may be derived by using a known method described in, for example, Japanese Unexamined Patent Application Publication No. 2016-212812. When the confidence level of each character in a character string is used, a technique for converting the confidence level of each character into the confidence level of the character string is used. Specifically, any appropriate one of the various techniques provided below may be selected.

(i) The maximum of the values of the confidence level of the characters in the character string is used as the confidence level of the character string.

(ii) The minimum of the values of the confidence level of the characters in the character string is used as the confidence level of the character string.

(iii) The mean (mode, median, or the like) of the values of the confidence level of the characters in the character string is used as the confidence level of the character string.

The validation and correction is used to set whether to perform a validation operation, and "required" or "not required" is set, by way of example. When "required" is set, a validation operation is performed each time recognition is performed. When "not required" is set, no validation operation is performed.

The type of entry is used to set the method by which a validation operation is performed when "required" is set in validation and correction. By way of example, any one of "double entry", "single entry", and "confidence level determination" is set. "Double entry" is a method in which a plurality of validators perform a validation operation, and "single entry" is a method in which a single validator performs a validation operation. "Confidence level determination" is a method in which either "single entry" or "double entry" is selected based on the result of comparison between the confidence level and the threshold (in the example illustrated in FIG. 4, "0.7"). In "confidence level determination", by way of example, either "single entry" or "double entry" is selected when the confidence level is less than the threshold, and no validation operation is performed (hereinafter referred to as the "no entry") when the confidence level is greater than or equal to the threshold.

The learned model is used to set a recognition dictionary for each item. In the example illustrated in FIG. 4, a recognition dictionary for "name" is set.

The recognition processing unit 220 receives input of a form image indicating a filled-in form, and executes OCR processing for each item in accordance with the content of the settings of the form definition data stored in the form definition data storage unit 14C. The recognition processing unit 220 outputs, for each item, an item image, a recognition result, and a confidence level in association with each other.

The validation process execution determination unit 230 determines a type of entry for each item on the basis of the item image, the recognition result, and the confidence level of the item, which are output from the recognition processing unit 220. For example, an item for which "single entry" or "double entry" is set as the type of entry is not subjected to threshold determination based on the confidence level. An item for which "confidence level determination" is set as the type of entry is subjected to threshold determination based on the confidence level, and a type of entry is determined in the way described above. The validation process execution determination unit 230 outputs a determination result to the validation processing unit 240.

The validation processing unit 240 changes the type of entry for each item on the basis of the determination result accepted from the validation process execution determination unit 230, and feeds back the item image and the recognition result to the validator U to prompt the validator U to perform a validation operation. Specifically, when the type of entry of the recognition result is determined to be single entry, the validation processing unit 240 causes a single validator terminal apparatus 40 to display a validation screen for validation to prompt the validator U to perform a validation operation. When the type of entry of the recognition result is determined to be double entry, the validation processing unit 240 causes a plurality of validator terminal apparatuses 40 to display a validation screen for validation to prompt the individual validators U to perform a validation operation. The validation processing unit 240 outputs the item image, the recognition result, and the result of the validation performed by the validator(s) U to the final validation processing unit 250.

Based on the item image, the recognition result, and the result of the validation performed by the validator(s) U, which are accepted from the validation processing unit 240, the final validation processing unit 250 prompts another validator U different from the validator(s) U to perform a final validation operation. Specifically, the final validation processing unit 250 causes the validator terminal apparatus 40 used by the different validator U to display a validation screen for final validation, and obtains a final validation result from the different validator U. Based on the final validation result from the different validator U, if the result of the validation performed by the validator(s) U is wrong, the final validation processing unit 250 returns the wrong result to the validation processing unit 240. If the input filled-in form is incomplete (e.g., page missing), the final validation processing unit 250 returns the incomplete form to the recognition processing unit 220. Then, the final validation processing unit 250 outputs a final recognition result to the recognition result output unit 260.

The recognition result output unit 260 outputs the final recognition result accepted from the final validation processing unit 250. The final recognition result may be output to, for example, but not limited to, at least one of the display unit 16, the validator terminal apparatus 40, and the administrator terminal apparatus 60.

The validation result obtained by the validation processing unit 240 and the final validation result obtained by the final validation processing unit 250 are stored in the actual data group storage unit 14B as an actual data group of the recognition result.

FIG. 5 illustrates an example of an actual data group according to this exemplary embodiment.

Each of the pieces of actual data in the actual data group illustrated in FIG. 5 is written in JavaScript (registered trademark) Object Notation (JSON) format, by way of example. Each of the pieces of actual data includes "confidence" and "correction". "Confidence", which is an indicative of confidence level, is expressed as a value of confidence level. "Correction", which is an indicative of correct/incorrect information, is expressed as a binary value (true/false) indicating whether the recognition result is correct. The value "true" indicates that the recognition result is not corrected, that is, the recognition result is correct, and the value "false" indicates that the recognition result is corrected, that is, the recognition result is incorrect.

As described specifically below, the threshold calculation unit 30 determines a threshold that defines segments so that, for example, pieces of actual data whose values of the confidence level are included in the respective segments are used as pieces of learning data in order from highest to lowest confidence level segment and a rate of correct recognitions obtained from the correct/incorrect information in each of the pieces of learning data satisfies the target accuracy of the recognition processing unit 220 for the associated segment.

The acceptance unit 32 accepts input of a new confidence level threshold. The new threshold may be a threshold calculated by the threshold calculation unit 30 or may be a threshold manually input by a user. By way of example, the acceptance unit 32 accepts input of a threshold for each of the frames in the form image. A plurality of frames may be designated in groups, and input of a threshold may be accepted in units of groups of designated frames.

When an input threshold accepted by the acceptance unit 32 is applied to the actual data group stored in the actual data group storage unit 14B, by way of example, as illustrated in FIG. 6, the classification unit 34 classifies the actual data group by necessity of validation on the basis of the result of comparison between the confidence level in each of the pieces of actual data in the actual data group and the threshold.

FIG. 6 illustrates an example of confidence level thresholds and classification results according to this exemplary embodiment.

The confidence level thresholds illustrated in FIG. 6 are thresholds calculated by the threshold calculation unit 30. The classification results illustrated in FIG. 6 are results of classifying the actual data group illustrated in FIG. 5 by using the calculated thresholds. In the illustrated example, the classification results are each indicated by the number of pieces of actual data. Alternatively, the classification results may be each indicated by a data list.

The display control unit 36 performs control to display, on the administrator terminal apparatus 60, the classification results obtained by the classification unit 34, by way of example, as illustrated in FIG. 16 described below. The classification results include a result for pieces of actual data that require validation when a new threshold is applied to the actual data group, and a result for pieces of actual data that require no validation when the new threshold is applied to the actual data group. The classification results may include a result for pieces of actual data that require validation when an existing threshold different from the new threshold is applied to the actual data group, and a result for pieces of actual data that require no validation when the existing threshold is applied to the actual data group.

The result for the pieces of actual data that require validation and the result for the pieces of actual data that require no validation are each represented by the number of pieces of actual data, by way of example. The result for the pieces of actual data that require validation and the result for the pieces of actual data that require no validation may be each represented by a representative image of the pieces of actual data. Examples of the representative image include an image of the piece of actual data having the lowest confidence level among the pieces of actual data that require validation, and an image of the piece of actual data having the lowest confidence level among the pieces of actual data that require no validation.

Further, the display control unit 36 may perform control to accept whether to set a new threshold on a classification result screen that displays the classification results (see FIG. 16 described below). By way of example, whether a new threshold can be set is determined for each frame. It is desirable that whether a threshold can be set be determined for each frame even when a new threshold is accepted in units of groups of a plurality of frames.

Further, by way of example, as illustrated in FIG. 16 described below, the display control unit 36 may perform control to display information indicating validity of the classification results on the classification result screen described above. The information indicating the validity of the classification results may be the minimum number of pieces of actual data required to calculate a threshold satisfying a pre-designated target accuracy. The term "target accuracy", as used herein, refers to the target recognition rate to be reached by the recognition processing unit 220. If the number of pieces of actual data in the actual data group is less than the minimum number of pieces of actual data, the display control unit 36 may perform control to display a warning on the classification result screen. Alternatively, if the number of pieces of actual data in the actual data group is less than the minimum number of pieces of actual data, the display control unit 36 may perform control to prohibit the setting of a threshold on the classification result screen.

Further, by way of example, as illustrated in FIG. 19 described below, the display control unit 36 may perform control to display a man-hour reduction rate estimated when a new threshold is applied in place of an existing threshold, on the basis of the classification results described above.

Next, the content of the process performed by the threshold calculation unit 30 will be described specifically. For example, the confidence levels derived by the recognition processing unit 220 are divided into N segments which are associated with N post-processing operations (such as single entry, double entry, and no entry described above) in order of rank such that each of the N segments is associated with one of the N post-processing operations. Each of the N post-processing operations is a process for validating a recognition result of the recognition processing unit 220. That is, a higher ranked post-processing operation is associated with a higher confidence level segment. The N post-processing operations are ranked 1, 2, 3, . . . , and N, with 1 being the highest ranking and N being the lowest ranking, by way of example. The larger the rank number, the higher the degree of dependence on the recognition processing unit 220. For example, no entry, single entry, and double entry are placed in order from highest to lowest degree of dependence on the recognition processing unit 220.

The following are the points of the threshold calculation process performed by the threshold calculation unit 30.

(i) A considerable number of pairs of the confidence level and correct/incorrect information in the respective pieces of actual data in the actual data group are input as pieces of learning data.

(ii) A target accuracy is set for each of the post-processing operations 1 to N. Each target accuracy is a level of accuracy required for a character string of a recognition result used for the associated post-processing operation. For example, the target accuracy is set higher for a post-processing operation with a larger number N.

(iii) Thresholds for reaching the target accuracies for the respective post-processing operations K (1≤K≤N) are calculated in order from the post-processing operation N to the post-processing operation 1.

The threshold calculation unit 30 receives input of M pieces of learning data (pairs of confidence level and correct/incorrect information), sorts the M pieces of learning data in order of confidence level, and calculates the cumulative number of correct recognitions for the first piece of learning data up to each of the sorted pieces of learning data by using the sorted pieces of learning data. Then, the threshold calculation unit 30 sets a target accuracy for each of the post-processing operations 1 to N. The target accuracy for the post-processing operation K represents a recognition rate to be satisfied by the post-processing operation K. The target accuracies are set by the user, by way of example. Then, the threshold calculation unit 30 calculates (N−1) thresholds used to bound the segments of confidence levels for the respective post-processing operations on the basis of the calculated cumulative numbers of correct recognitions and the target accuracies set for the respective post-processing operations.

Next, a threshold calculation process performed by the threshold calculation unit 30 will be described with reference to FIG. 7 to FIG. 10.

To divide a range that can be taken by the confidence level X into N segments, (N−1) thresholds need be determined. The (N−1) thresholds set here are represented by $T_1, T_2, \ldots,$ and $T_{N-1}$. In the following examples, the range that can be taken by the confidence level X is defined as the range of real numbers from 0 to 1 since there is no loss of generality if it is done so. Further, the number of each segment (post-processing operation) is represented by K.

Figure 7:
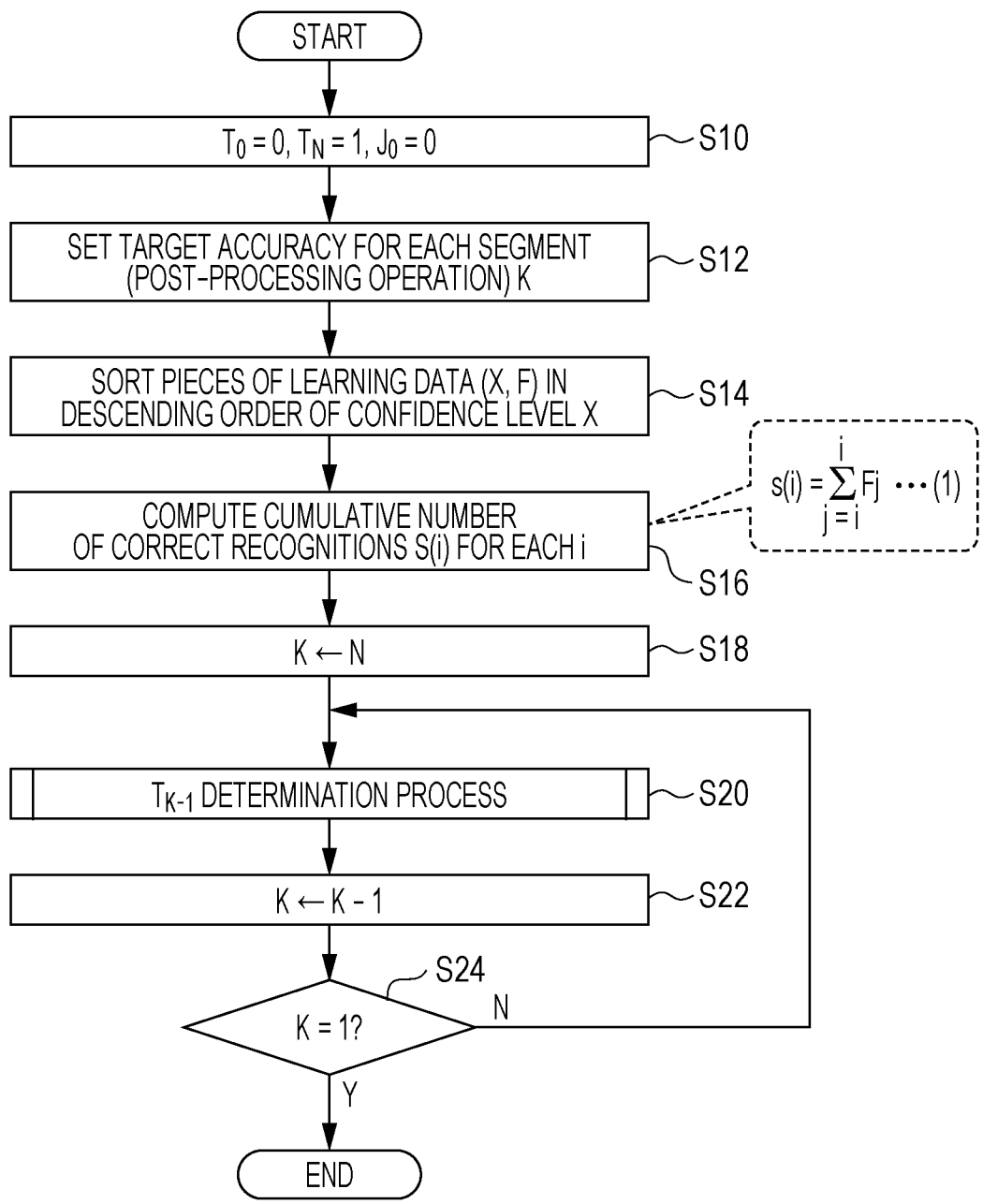
FIG. 7 is a flowchart illustrating an example flow of a threshold calculation process according to the exemplary embodiment.

FIG. 7 is a flowchart illustrating an example flow of a threshold calculation process according to this exemplary embodiment.

First, the threshold calculation unit 30 sets both ends of the thresholds to $T_0=0$ and $T_N=1$, and sets the initial value $J_0$ of the threshold index $J_K$ to 0 (S10). In this example, the index j for $T_K=X_j$ is represented by $j=J_{N-K}$. That is, the procedure described below may be regarded as an algorithm for determining the threshold index $J_{N-K}$ to determine the threshold $T_K$. Here, $X_j$ is the confidence level in the j-th piece of learning data, where 1≤j≤M. As described below, the pieces of learning data are sorted so that if i>j, then $X_i \leq X_j$ can be satisfied.

Then, the threshold calculation unit 30 sets a target accuracy $Y_K$ for each segment K (S12). The target accuracy $Y_K$ represents the target recognition rate (i.e., the target rate of correct recognitions) to be reached by the recognition processing unit 220 for the post-processing operation K corresponding to the segment K. By way of example, the larger the number of the segment K, the higher the target accuracy $Y_K$ is set. The setting of the target accuracy $Y_K$ in S12 is performed by, for example, a user.

Then, the threshold calculation unit 30 sorts the pieces of learning data in descending order of the confidence level X (S14). As described above, each of the pieces of learning data is constituted by a pair of confidence level X and correct/incorrect information F. For the pieces of learning data sorted in descending order of the confidence level X, if i>j, then a relationship given by $X_i \leq X_j$ is satisfied. That is, as the value of the index j increases, the confidence level X for the piece of learning data j monotonically decreases. Sorting the pieces of learning data by confidence level in advance results in high-speed calculation of the cumulative number of correct recognitions S(i) described below. In addition, the pre-calculation of the cumulative number of correct recognitions S(i) eliminates the need to add together pieces of learning data included in the desired post-processing operation each time a post-processing operation is performed, resulting in a high-speed threshold calculation process. The relationship between each segment (post-processing operation) K and the confidence level $X_j$ in each piece of learning data j, the threshold index $J_K$, and the threshold $T_K$ after the sorting operation is illustrated in FIG. 8.

Figure 8:
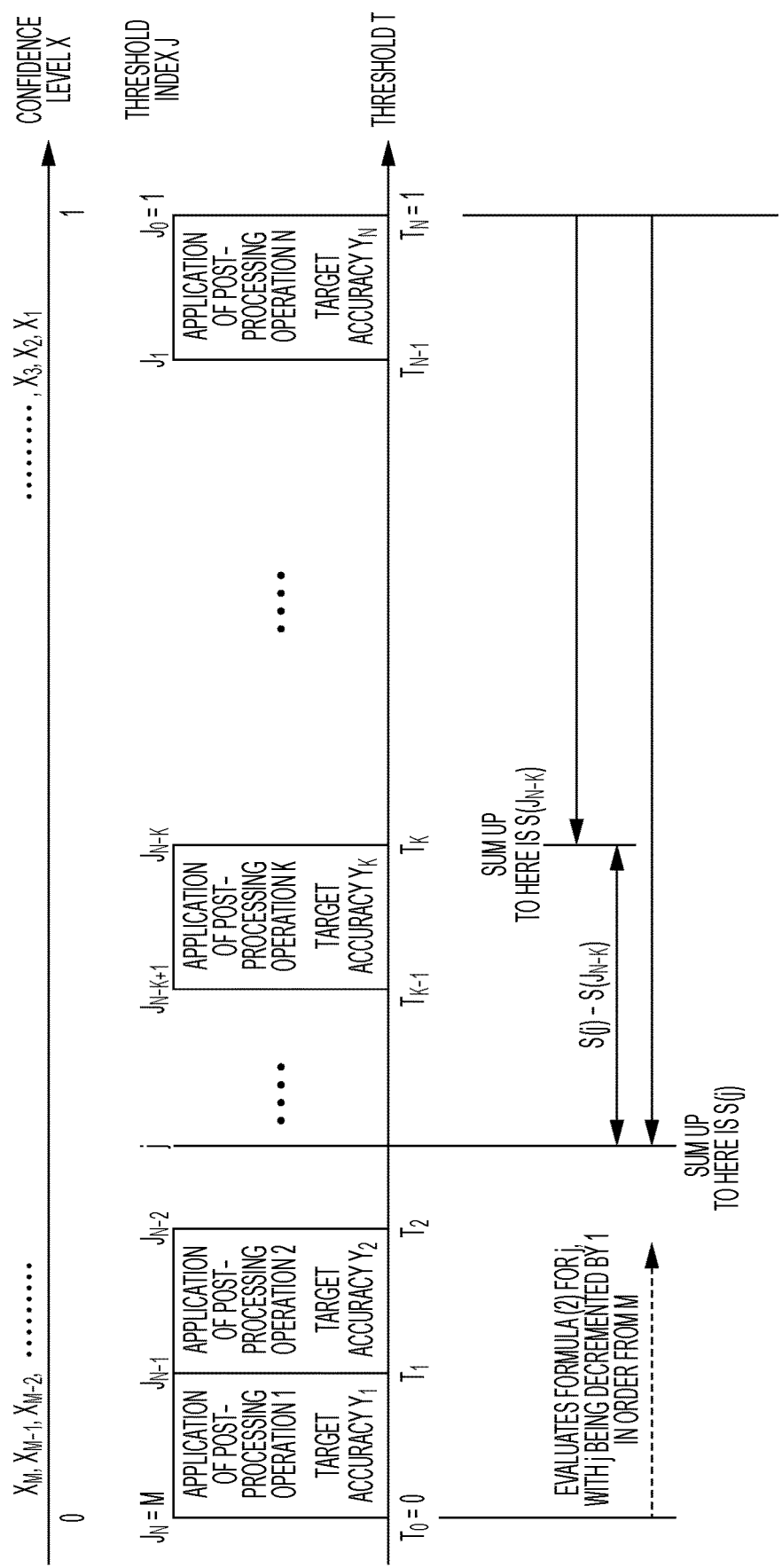
FIG. 8 is a schematic diagram describing the threshold calculation process according to the exemplary embodiment.

FIG. 8 is a schematic diagram describing the threshold calculation process according to this exemplary embodiment.

As illustrated in FIG. 8, the segment K in which the post-processing operation K is applied is a segment in which the confidence level X is greater than or equal to the threshold $T_{K-1}$ and less than the threshold $T_K$. The value of the target accuracy set for the segment K is represented by $Y_K$. The value of the confidence level $X_j$ in each piece of learning data j decreases as the index j increases. Given that the number of pieces of learning data is M, $X_M$ is a minimum of the values of the confidence level of the pieces of learning data. In addition, from the definition, the confidence level X obtained when $j=J_{N-K}$ is satisfied is equal to the threshold $T_k$.

In the procedure illustrated in FIG. 7, as illustrated in FIG. 8, the threshold $T_K$ is determined in order from K=N in the direction in which K decreases. In other words, the threshold index $J_m$ is determined in the direction in which m increases from 0.

Referring back to the procedure illustrated in FIG. 7, after S14, the threshold calculation unit 30 computes the cumulative number of correct recognitions S(i) for each index i (S16) by using formula (1) illustrated in FIG. 7. That is, the cumulative number of correct recognitions S(i) is the sum of pieces of correct/incorrect information $F_j$ ("1" for correct recognition, and "0" for incorrect recognition) in the respective pieces of learning data j, where j is 1 to i.

Then, the threshold calculation unit 30 initializes the index K of the threshold $T_K$ to N (=total number of post-processing operations) (S18).

Then, the threshold calculation unit 30 executes a process for determining the threshold $T_{K-1}$ (S20). For the segment N, which is processed in the first loop, the upper-limit threshold $T_N$ is determined to be 1. In S20, the lower-limit threshold $T_{N-1}$ for the segment N is determined. A specific process of S20 will be described with reference to FIG. 9 described below.

After the determination of the threshold $T_{K-1}$, the threshold calculation unit 30 decrements the index K by 1 (S22), and determines whether, as a result of the decrement operation, the index K has reached 1 (S24). If the index K is determined not to be 1 (if negative determination is obtained, i.e., if the index K is greater than or equal to 2), not all of the thresholds have been determined, and then the process returns to S20 to determine the threshold $T_{K-1}$. If the index K is determined to have reached 1 (if positive determination is obtained), this means that the determination of all of the thresholds $T_1$ to $T_{N-1}$ to be determined is completed. Thus, the threshold calculation process ends.

Next, the process for determining the threshold $T_{K-1}$ (S20) will be described specifically with reference to FIG. 9.

Figure 9:
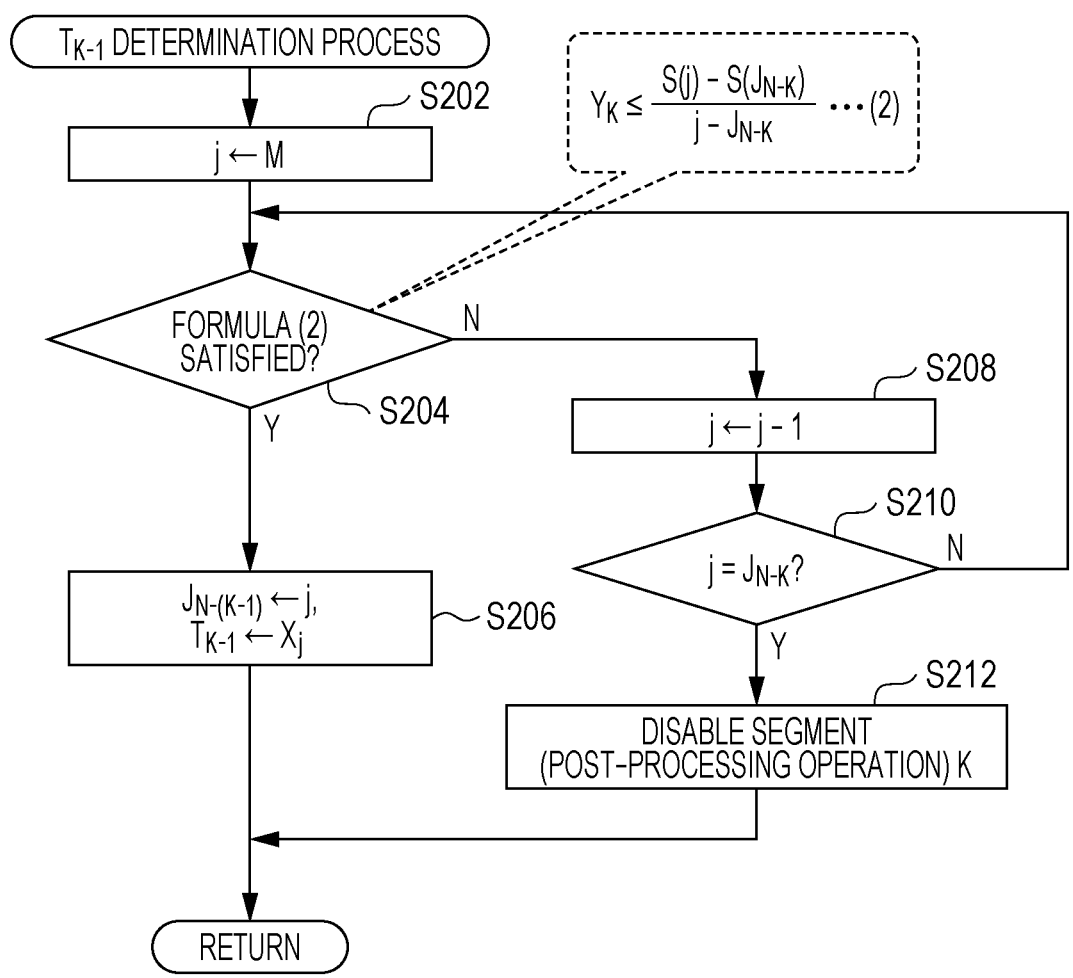
FIG. 9 is a flowchart illustrating an example flow of a threshold determination process according to the exemplary embodiment.

FIG. 9 is a flowchart illustrating an example flow of a threshold determination process according to this exemplary embodiment.

At the time when this procedure is started, the thresholds $T_N$, $T_{N-1}$, $T_{N-2}$ . . . , and $T_K$ have been determined.

First, the threshold calculation unit 30 initializes the index j of the cumulative number of correct recognitions S(j) to M (i.e., the total number of pieces of learning data) (S202).

Then, the threshold calculation unit 30 determines whether formula (2) illustrated in FIG. 9 is satisfied (S204). Referring to FIG. 8 described above, $S(J_{N-K})$ denotes the total number of correct recognitions from the correct/incorrect information $F_i$ in the piece of learning data including the maximum value $X_1$ of the confidence level to the correct/incorrect information $F_{j(K)}$ in the piece of learning data including the confidence level $X_{j(K)}$ corresponding to the threshold index $J_{N-K}$ (=j(K)) of the determined threshold $T_K$. In contrast, S(j) denotes the total number of correct recognitions from the correct/incorrect information $F_1$ to the correct/incorrect information $F_j$ corresponding to a larger index j than the threshold index $J_{N-K}$. The difference between $S(J_{N-K})$ and S(j) (i.e., $S(j)-S(J_{N-K})$) represents the total number of correct recognitions across the segments from $J_{N-K}$ to j, which is divided by $(j-J_{N-K})$ to determine the rate of correct recognitions of the recognition processing unit 220 for the corresponding segment.

If the determined rate of correct recognitions is greater than or equal to the target accuracy $Y_K$ for the segment K being subjected to the threshold determination process, the segments from $J_{N-K}$ to j satisfy the condition of the target accuracy for the segment K (positive determination in S204). In this case, the threshold calculation unit 30 uses the confidence level $X_j$ corresponding to j at this time as the threshold $T_{K-1}$ that defines the lower limit of the confidence level for the segment K (S206). In addition, at this time, j is stored as the threshold index $J_{N-K+1}$ corresponding to the threshold $T_{K-1}$.

If the determination result of S204 is negative, the threshold calculation unit 30 decrements the index j by 1 (S208), and determines whether, as a result of the decrement operation, the new index j has reached the upper-limit threshold index $J_{N-K}$ for the segment K (S210). If the determination result of S210 is negative, the process returns to S204, and the threshold calculation unit 30 evaluates formula (2) for the new index j.

The evaluation of formula (2) is performed repeatedly, with the index j being decremented by 1 in order from the maximum value M (S208). If j has reached $J_{N-K}$ (if the determination result of S210 is positive), this indicates that no confidence level X may be included in the segment K. In this case, the threshold calculation unit 30 disables the post-processing operation K corresponding to the segment K (S212). That is, the post-processing operation K is not used.

In the procedure illustrated in FIG. 9, evaluations proceed in order in the direction in which the index j decreases from the maximum value M. Accordingly, the segment K determined in this procedure is a segment having a maximum width and satisfying the target accuracy $Y_K$. In the procedure illustrated in FIG. 7, the boundary (the lower-limit threshold $T_{K-1}$) of each of the segments K is determined in order from the segment K for which the corresponding confidence level X (in another viewpoint, the corresponding target accuracy $Y_K$) is the highest. This ensures that segments, each having a maximum width and satisfying the target accuracy $Y_K$, can be obtained in order from the segment K with the highest confidence level X.

Figure 10:
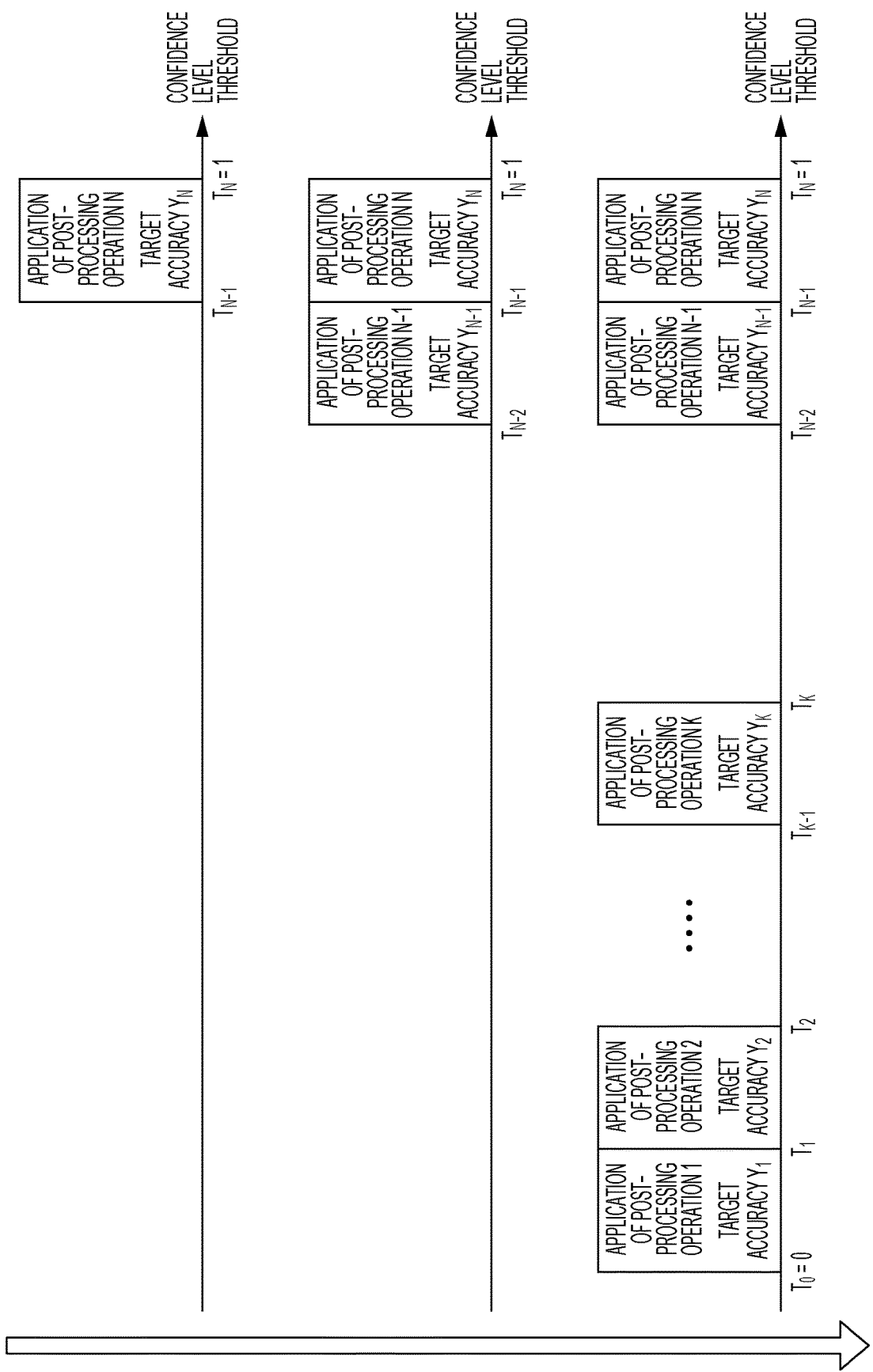
FIG. 10 is a schematic diagram describing the threshold determination process according to the exemplary embodiment.

FIG. 10 is a schematic diagram describing the threshold determination process according to this exemplary embodiment.

In the example illustrated in FIG. 10, the lower-limit threshold $T_{N-1}$ for a segment N of a post-processing operation N for which the corresponding confidence level is highest is first determined so that the segment N has a maximum width within a range in which the target accuracy $Y_N$ is satisfied, and then the threshold $T_{N-2}$ is determined so that the segment (N−1) has a maximum width within a range in which the target accuracy $Y_{N-1}$ is satisfied. This determination process is repeatedly performed until the upper-limit threshold $T_1$ for segment 1 for which the corresponding confidence level is lowest (i.e., the lower-limit threshold for segment 2) is determined.

Next, the operation of the server apparatus 10 according to this exemplary embodiment will be described with reference to FIG. 11 and FIG. 12.

Figure 11:
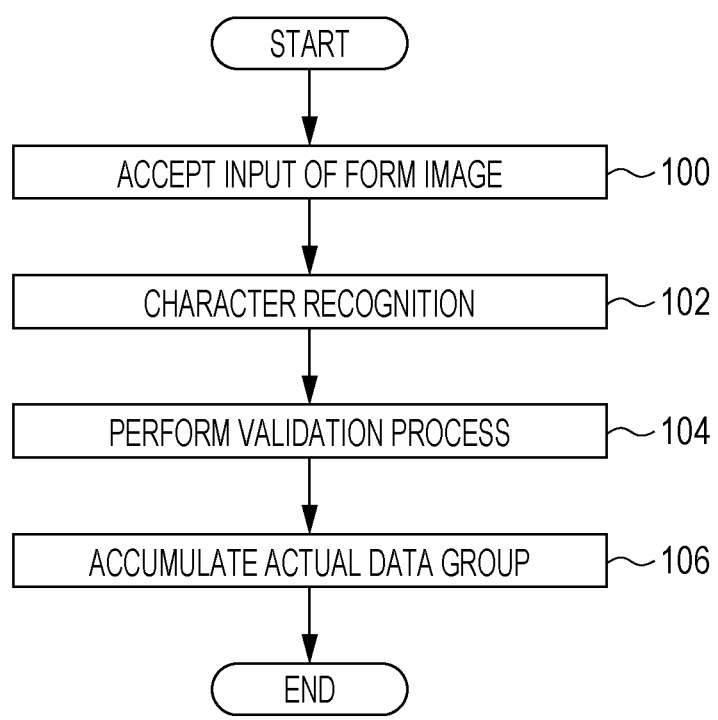
FIG. 11 is a flowchart illustrating an example flow of a validation process performed in accordance with a validation process program according to the exemplary embodiment.

FIG. 11 is a flowchart illustrating an example flow of a validation process performed in accordance with the validation process program 14A according to this exemplary embodiment.

First, when the server apparatus 10 is instructed to execute a validation process, the validation process program 14A is started, and the following steps are executed.

In step 100 in FIG. 11, the CPU 12A, which serves as the recognition processing unit 220, accepts input of a form image.

In step 102, the CPU 12A, which serves as the recognition processing unit 220, performs character recognition on an item image for each item in the form image whose input is accepted in step 100, and derives a confidence level of a recognition result.

In step 104, the CPU 12A, which serves as the validation processing unit 240 and the final validation processing unit 250, causes the validator U to perform a validation process. Specifically, as described above, the validator U views an item image displayed on the UI screen of the validator terminal apparatus 40 and validates whether the character string of the recognition result corresponding to the item image is correct. As a result of the validation, if the character string is correct, the validator U performs no operation, and if the character string is not correct, the validator U inputs a correct character string on the UI screen. The server apparatus 10 receives the character string whose input is accepted through the UI screen from the validator terminal apparatus 40 as a validation result.

In step 106, the CPU 12A receives the result of the validation process performed in step 104, and accumulates, for the respective items in the form image, the pairs of confidence level and correct/incorrect information illustrated in FIG. 5 described above in the actual data group storage unit 14B as an actual data group, by way of example. Then, the validation process according to the validation process program 14A ends.

Figure 12:
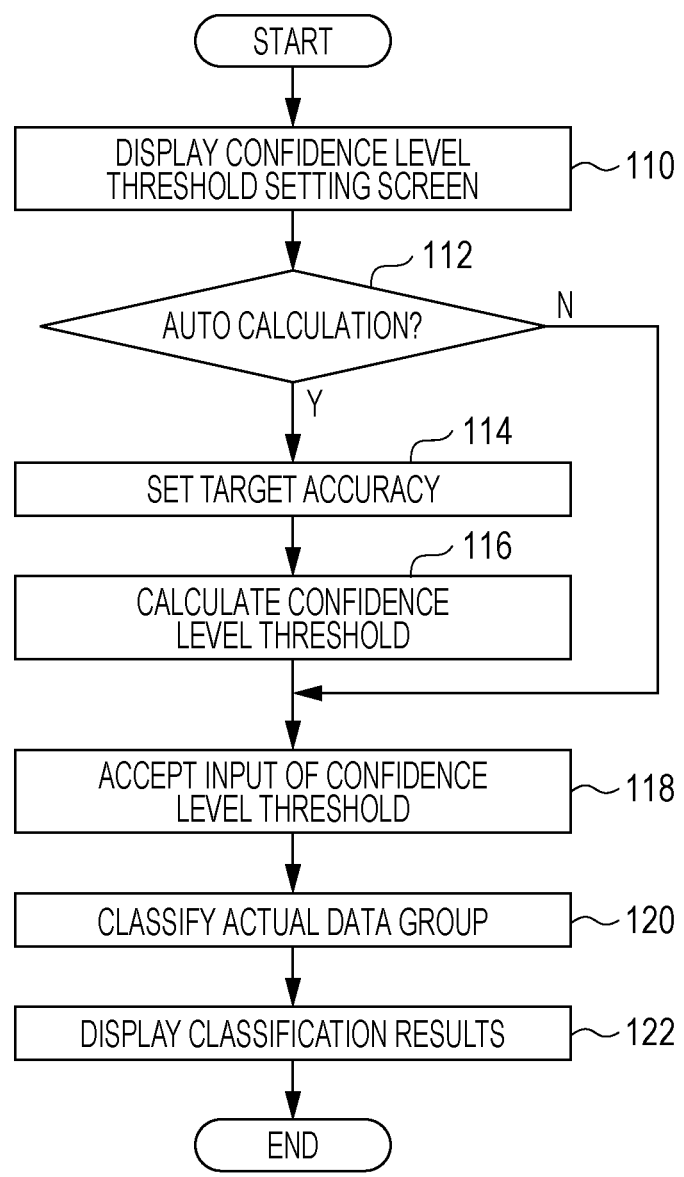
FIG. 12 is a flowchart illustrating an example flow of a confidence level threshold setting process performed in accordance with the validation process program according to the exemplary embodiment.

FIG. 12 is a flowchart illustrating an example flow of a confidence level threshold setting process performed in accordance with the validation process program 14A according to this exemplary embodiment.

First, when the server apparatus 10 is instructed to execute a confidence level threshold setting process, the validation process program 14A is started, and the following steps are executed.

In step 110, the CPU 12A, which serves as the display control unit 36, performs control to display a confidence level threshold setting screen 64 illustrated in FIG. 13 on the administrator terminal apparatus 60, by way of example.

FIG. 13 is a front view illustrating an example of the confidence level threshold setting screen 64 according to this exemplary embodiment.

The confidence level threshold setting screen 64 illustrated in FIG. 13 is a screen displayed on the administrator terminal apparatus 60 for accepting input of thresholds by the system administrator SE.

The confidence level threshold setting screen 64 illustrated in FIG. 13 includes an Auto Calculate button 64A and a Manual Input button 64B. The Auto Calculate button 64A is a button selected to automatically calculate a confidence level threshold. The Manual Input button 64B is a button selected to manually input a confidence level threshold.

In step 112, the CPU 12A, which serves as the display control unit 36, determines whether the Auto Calculate button 64A is selected on the confidence level threshold setting screen 64 illustrated in FIG. 13, by way of example. If it is determined that the Auto Calculate button 64A is selected (if positive determination is obtained), the process proceeds to step 114. If it is determined that the Auto Calculate button 64A is not selected, that is, the Manual Input button 64B is selected (if negative determination is obtained), the process proceeds to step 118.

In step 114, the CPU 12A, which serves as the display control unit 36, performs control to superimpose a target accuracy setting dialog 66 illustrated in FIG. 14 or FIG. 15 on the confidence level threshold setting screen 64, and accepts the setting of a target accuracy.

FIG. 14 is a front view illustrating an example of the target accuracy setting dialog 66 according to this exemplary embodiment.

The target accuracy setting dialog 66 illustrated in FIG. 14 is a screen for setting a target accuracy used for the calculation of a confidence level threshold. The target accuracy may be set using a predetermined default value or may be set manually.

In the example illustrated in FIG. 14, two confidence level thresholds (threshold 1 and threshold 2) are fixed, and the range of values of the confidence level is divided into three confidence level regions using the two thresholds. In this case, a target accuracy for the threshold 1 is input. Then, a target accuracy for the threshold 2 is calculated from the input target accuracy. The calculation of the target accuracy for the threshold 2 will be described below.

When an Execute button 66A is selected on the target accuracy setting dialog 66 illustrated in FIG. 14, the calculation of a confidence level threshold is executed. When a Cancel button 66B is selected on the target accuracy setting dialog 66, the calculation of a confidence level threshold is stopped.

FIG. 15 is a front view illustrating another example of the target accuracy setting dialog 66 according to this exemplary embodiment.

The target accuracy setting dialog 66 illustrated in FIG. 15 is configured such that confidence level thresholds can be changed and a target accuracy is set for each threshold. That is, in the example illustrated in FIG. 15, the number of confidence level thresholds is not limited to two, and the number of confidence level thresholds and the number of confidence level regions can be changed. Note that the input field of the target accuracy for the threshold 1 is always displayed and is not removable. When a "+" button in a lower portion of the target accuracy setting dialog 66 is selected, an additional input field of a target accuracy for a threshold is displayed. The input field of the target accuracy for the threshold 2 indicates an added input field. When a "x" button located near the threshold 2 is selected, the input field of the target accuracy for the threshold 2 disappears.

In step 116, the CPU 12A, which serves as the threshold calculation unit 30, calculates a confidence level threshold. By way of example, the CPU 12A determines a confidence level threshold based on the target accuracy for the threshold 1 set in step 114 through the target accuracy setting dialog 66 illustrated in FIG. 14 in the way described above with reference to FIG. 7 to FIG. 10 so as to satisfy formula (2) above. The target accuracy for the threshold 2 is calculated in the following way. For example, when the validation operation of a recognition result is double entry, single entry, or no entry, a target accuracy R of the system is equal to the target accuracy (known) for the threshold 1, which is equal to the target accuracy based on double entry by two validators U. In this case, the target accuracy R for the threshold 2 can be regarded as the target accuracy based on single entry by a single validator U. Note that it is assumed that the two validators U do not make the same mistake during the validation operation.

(1) The probability that any one of the validators U in double entry makes a mistake is given by $1-r^2$.

(2) The probability that any third validator U makes a mistake in the case described above is given by $1-r$.

From (1) and (2) above, the relationship given by $1-R=(1-r)(1-r^2)$ is satisfied. By solving a cubic equation for r, the target accuracy R for the threshold 2 is calculated.

In step 118, the CPU 12A, which serves as the acceptance unit 32, accepts input of the confidence level threshold calculated in step 116 or accepts a manually input confidence level threshold. When a confidence level threshold is manually input, by way of example, the Manual Input button 64B on the confidence level threshold setting screen 64 illustrated in FIG. 13 is selected, and a manual input dialog (not illustrated) is superimposed on the confidence level threshold setting screen 64.

In step 120, when the threshold whose input is accepted in step 118 is applied to the actual data group stored in the actual data group storage unit 14B, the CPU 12A, which serves as the classification unit 34, classifies the actual data group by necessity of validation on the basis of the result of comparison between the confidence level in each of the pieces of actual data in the actual data group and the threshold.

In step 122, the CPU 12A, which serves as the display control unit 36, performs control to display classification results obtained by the classification in step 120 on the administrator terminal apparatus 60. Specifically, by way of example, the CPU 12A performs control to superimpose a confidence level threshold calculation result validation dialog 68 illustrated in FIG. 16 on the confidence level threshold setting screen 64.

FIG. 16 is a front view illustrating an example of the confidence level threshold calculation result validation dialog 68 according to this exemplary embodiment.

The confidence level threshold calculation result validation dialog 68 illustrated in FIG. 16 is an example of a classification result screen. The confidence level threshold calculation result validation dialog 68 includes confidence level thresholds 68A, classification results 68B, the number of pieces of required data 68C, a warning message 68D, a Set button 68E, and a Not set button 68F.

The confidence level thresholds 68A indicate two thresholds (threshold 1 and threshold 2) that are newly calculated. The actual data group (in the illustrated example, 2919 pieces of data) is classified into three confidence level regions by using the two thresholds.

The classification results 68B indicate classification results before application and classification results after application. The classification results 68B indicate classification results obtained when the two newly calculated thresholds are applied to the actual data group, and also display classification results obtained when two existing thresholds (e.g., the currently set thresholds) are applied to the actual data group for comparison. In the classification results before application, among the 2919 pieces of actual data in the accumulated actual data group, 23 pieces of actual data are classified into a confidence level region [high], 925 pieces of actual data are classified into a confidence level region [intermediate], and 1971 pieces of actual data are classified into a confidence level region [low]. In contrast, in the classification results after application, among the 2919 pieces of actual data in the accumulated actual data group, 421 pieces of actual data are classified into the confidence level region [high], 1331 pieces of actual data are classified into the confidence level region [intermediate], and 1167 pieces of actual data are classified into the confidence level region [low]. The confidence level region [high] indicates a region that requires no validation, the confidence level region [intermediate] indicates a region that requires validation by a single validator U, and the confidence level region [low] indicates a region that requires validation by two validators U.

This exemplary embodiment is not limited to the case illustrated in FIG. 16 where the actual data group is classified into three groups by necessity of validation by using two newly set thresholds. In this exemplary embodiment, the actual data group may be classified into two groups by necessity of validation by using one newly set threshold, or the actual data group may be classified into four or more groups by necessity of validation by using three or more newly set thresholds.

The number of pieces of required data 68C indicates the minimum number of pieces of actual data required to calculate a threshold satisfying a pre-designated target accuracy. Given that a target accuracy (0 to 1) is represented by P, the number of pieces of data N determined by the following equation may be statistically sufficient.

$$N = 10/(1-P)$$

The target accuracy refers to a target accuracy of the final output of the system, and is represented by a value of 0 to 1 (or represented by 0% to 100% in terms of the target recognition rate). A target accuracy having a high value indicates high accuracy, and a target accuracy of 1 indicates that the accuracy level of the final output of the system is 1, that is, an OCR recognition rate of 100%. For example, as a result of the calculation of a threshold by using the threshold calculation process described above when the number of pieces of data is small and a large number of pieces of data including low confidence levels and correct recognition results are accidentally accumulated, a low threshold may be calculated. When this threshold is applied, expected target accuracy may not be satisfied. Accordingly, a larger number of pieces of data are used for higher target accuracy to calculate an appropriate threshold, and the number of pieces of data determined accordingly is defined as a statistical measure in the above equation.

The warning message 68D is displayed when the number of pieces of actual data in the accumulated actual data group (in the example illustrated in FIG. 16, 2919) is less than the number of pieces of required data 68C (in the example illustrated in FIG. 16, 5000). The warning message 68D suggests that "the expected effect will not be achieved". In this case, the system administrator SE finally determines whether to set a threshold.

When the system administrator SE views the content of the confidence level threshold calculation result validation dialog 68 and selects the Set button 68E, by way of example, as illustrated in FIG. 17, a new threshold is set. If the Not set button 68F is selected, no new threshold is set. If the number of pieces of actual data in the accumulated actual data group is less than the number of pieces of required data 68C, a warning message, such as "the setting of a threshold is prohibited since the number of accumulated pieces of data is insufficient", may be displayed.

FIG. 17 is a front view illustrating another example of the confidence level threshold setting screen 64 according to this exemplary embodiment.

On the confidence level threshold setting screen 64 illustrated in FIG. 17, new thresholds are set for the confidence level threshold 1 and the confidence level threshold 2.

Referring back to step 122 in FIG. 12, the CPU 12A reflects a new threshold set in the way described above in the form definition data. Then, the confidence level threshold setting process performed in accordance with the validation process program 14A ends.

Next, other examples of the confidence level threshold calculation result validation dialog 68 will be described with reference to FIG. 18 to FIG. 20.

Figure 18:
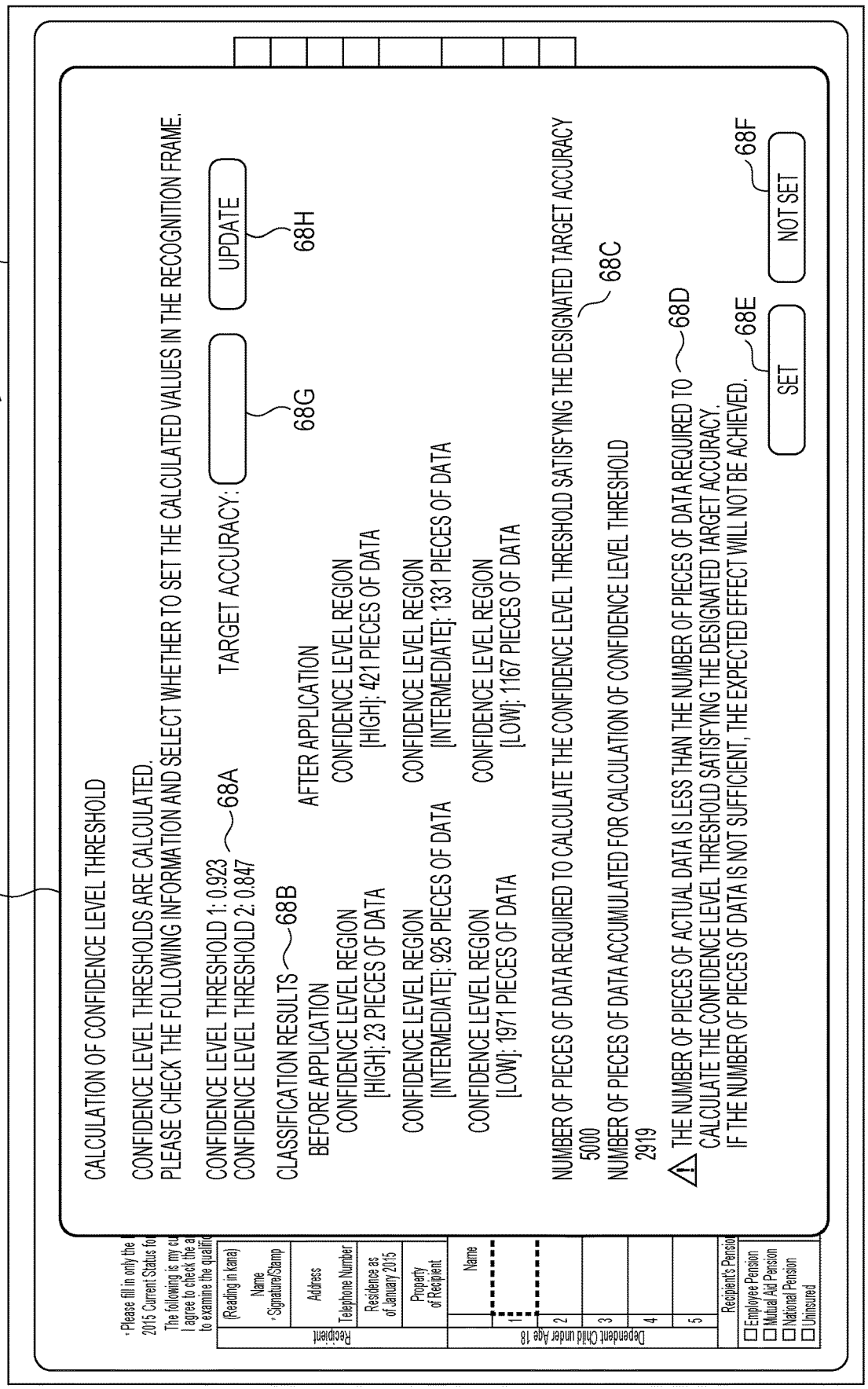
FIG. 18 is a front view illustrating another example of the confidence level threshold calculation result validation dialog according to the exemplary embodiment.

FIG. 18 is a front view illustrating another example of the confidence level threshold calculation result validation dialog 68 according to this exemplary embodiment.

The confidence level threshold calculation result validation dialog 68 illustrated in FIG. 18 contains a re-input field 68G for a target accuracy. When the system administrator SE re-inputs a target accuracy in the re-input field 68G and selects an Update button 68H, the threshold 1 and the threshold 2 in the confidence level thresholds 68A are re-computed, and the classification results 68B are updated.

FIG. 19 is a front view illustrating still another example of the confidence level threshold calculation result validation dialog 68 according to this exemplary embodiment.

The confidence level threshold calculation result validation dialog 68 illustrated in FIG. 19 contains a display field 68I of the man-hour reduction rate. The display field 68I shows 25% as an example of the man-hour reduction rate. A specific method for calculating the man-hour reduction rate will be described hereinbelow.

For example, "0" man-hours are set for the region that requires no validation (the confidence level region [high]), "1" man-hour is set for the region that requires validation by a single validator U (the confidence level region [intermediate]), and "2" man-hours are set for the region that requires validation by two validators U (the confidence level region [low]). In this case, the man-hours before the application of the new thresholds are calculated by 23 pieces of data×0+ 925 pieces of data×1+1971 pieces of data×2=4867. In contrast, the man-hours after the application of the new thresholds are calculated by 421 pieces of data×0+1331 pieces of data×1+1167 pieces of data×2=3665. Accordingly, the man-hour reduction rate is calculated by ((4867−3665)/4867)× 100≈25, that is, 25%.

The rate of change in the number of pieces of data may be calculated for each confidence level region and displayed. For example, the number of pieces of data for the confidence level region [intermediate] before application is 925, and the number of pieces of data for the confidence level region [intermediate] after application is 1331. In this case, the rate of change in the number of pieces of data is calculated by ((1331−925)/925)×100≈44, that is, an increase of 44%.

Figure 20:
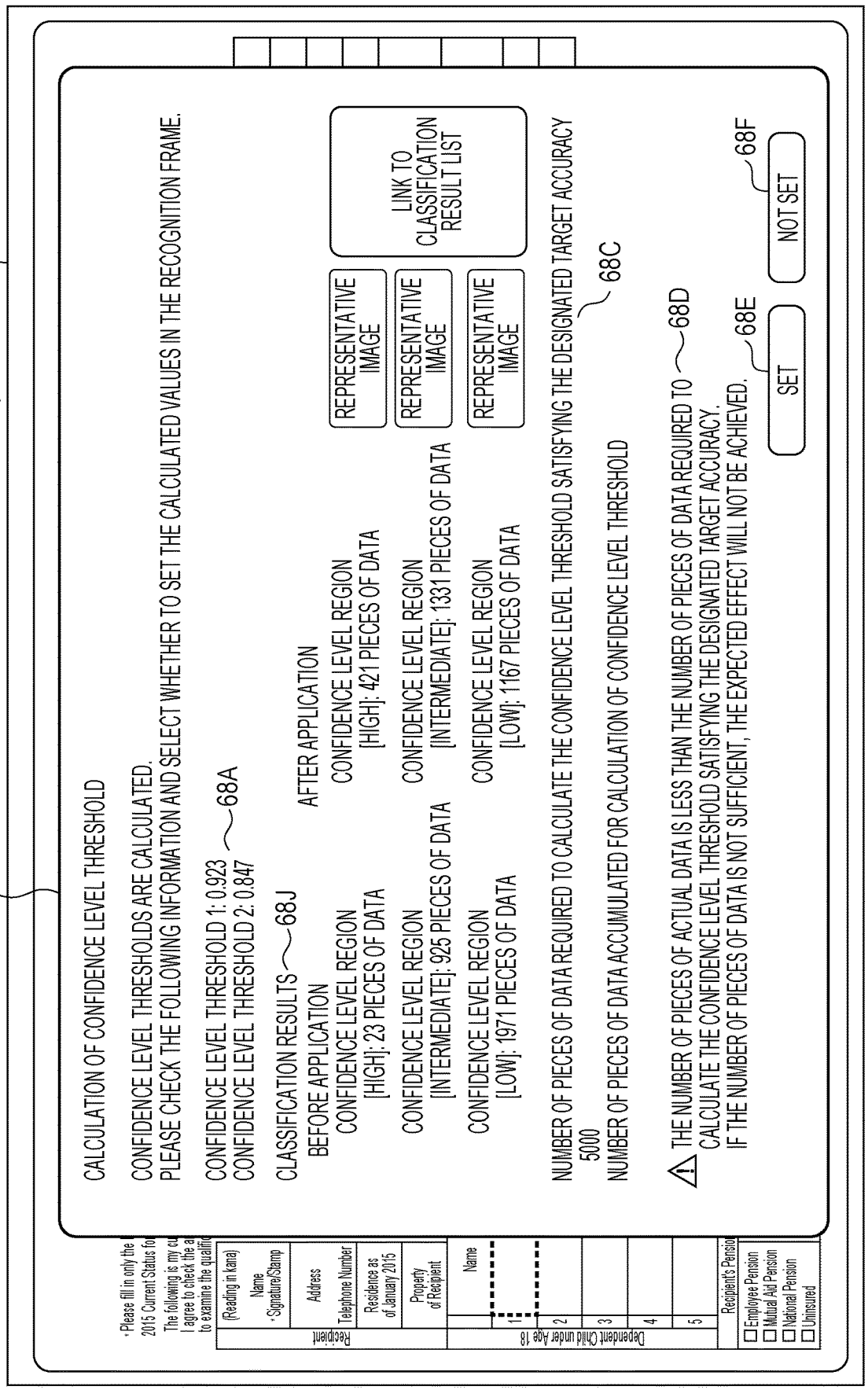
FIG. 20 is a front view illustrating still another example of the confidence level threshold calculation result validation dialog according to the exemplary embodiment.

FIG. 20 is a front view illustrating still another example of the confidence level threshold calculation result validation dialog 68 according to this exemplary embodiment.

The confidence level threshold calculation result validation dialog 68 illustrated in FIG. 20 contains classification results 68J. The classification results 68J show representative images for the classification results after application in addition to the numbers of pieces of actual data. By way of example, as described above, each of the representative images is an image of the piece of actual data having the lowest confidence level among the pieces of actual data belonging to the corresponding confidence level region. Representative images may also be displayed for the classification results before application.

As illustrated in FIG. 20, when representative images are displayed as classification results, a "link to a classification result list" is provided near the representative images. When any of the representative images is selected and the link is selected, the classification result list is displayed. In the classification result list, by way of example, a list of pieces of actual data for the confidence level region including the selected representative image is displayed together with the number of pieces of actual data. In the classification result list, a list of pieces of actual data for all the confidence level regions may be displayed together with the numbers of pieces of actual data for the respective confidence level regions.

In this exemplary embodiment, accordingly, when the necessity of validation is determined by confidence level, a new threshold used for the determination of a confidence level is applied to an actual data group, and results of classifying the actual data group by necessity of validation are obtained. The classification results may allow a user to easily determine the effect of the new threshold on the validation operation.

In the foregoing description, a server apparatus is used as an example of an information processing apparatus according to an exemplary embodiment. An exemplary embodiment may provide a program for causing a computer to execute the functions of the components of the server apparatus. An exemplary embodiment may provide a computer-readable non-transitory storage medium storing the program described above.

In addition, the configuration of the server apparatus provided in the exemplary embodiment described above is an example, and may be modified depending on the situation without departing from the spirit of the present disclosure.

In addition, the flow of the processes of the program provided in the exemplary embodiment described above is also an example. An unnecessary step may be deleted, a new step may be added, or the processing order may be changed without departing from the spirit of the present disclosure.

In the exemplary embodiment described above, furthermore, a program is executed to implement the processes according to the exemplary embodiment by a software configuration using a computer, by way of example but not limitation. The exemplary embodiment may be implemented by a hardware configuration or a combination of a hardware configuration and a software configuration, for example.

In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a memory; and
a processor connected to the memory and configured to
 accept input of a threshold of a confidence level indicating how confident a recognition result obtained by recognizing an image is,
 when the threshold whose input is accepted is applied to an actual data group constituted by one or more pieces of actual data that are recognition results accumulated as actual performance results, classify the actual data group by necessity of validation on the basis of a result of comparison between a confidence level in each of the one or more pieces of actual data in the actual data group and the threshold, and
 perform control to display classification results obtained by the classification,
wherein the classification results include:
 a first result for at least one first piece of actual data that requires validation when the threshold is applied to the actual data group,
 a second result for at least one second piece of actual data that requires no validation when the threshold is applied to the actual data group,
 a third result for at least one third piece of actual data that requires validation when an existing threshold different from the threshold is applied to the actual data group, and
 a fourth result for at least one fourth piece of actual data that requires no validation when the existing threshold is applied to the actual data group.

2. The information processing apparatus according to claim 1, wherein
the processor further performs control to accept whether to set the threshold on a classification result screen that displays the classification results.

3. The information processing apparatus according to claim 1, wherein
the image comprises a form image indicating a document form, and
the processor accepts input of the threshold for each frame in the form image.

4. The information processing apparatus according to claim 1, wherein
the result for the at least one first piece of actual data that requires validation and the result for the at least one second piece of actual data that requires no validation comprise the numbers of pieces of actual data or representative images.

5. The information processing apparatus according to claim 4, wherein
the representative images comprise an image of a piece of actual data having a lowest confidence level among the at least one first piece of actual data that requires validation, and an image of a piece of actual data having a lowest confidence level among the at least one second piece of actual data that requires no validation.

6. The information processing apparatus according to claim 1, wherein
the result for the at least one third piece of actual data that requires validation and the result for the at least one fourth piece of actual data that requires no validation comprise the numbers of pieces of actual data or representative images.

7. The information processing apparatus according to claim 6, wherein
the representative images comprise an image of a piece of actual data having a lowest confidence level among the at least one third piece of actual data that requires validation, and an image of a piece of actual data having a lowest confidence level among the at least one fourth piece of actual data that requires no validation.

8. The information processing apparatus according to claim 1, wherein
the processor further performs control to display information indicating validity of the classification results on a classification result screen that displays the classification results.

9. The information processing apparatus according to claim 8, wherein
the information indicating the validity of the classification results comprises the minimum number of pieces of actual data required to calculate a threshold satisfying a pre-designated target accuracy.

10. The information processing apparatus according to claim 9, wherein
the processor further performs control to display a warning on the classification result screen when the number of pieces of actual data in the actual data group is less than the minimum number of pieces of actual data.

11. The information processing apparatus according to claim 9, wherein
the processor further performs control to prohibit setting of the threshold on the classification result screen when the number of pieces of actual data in the actual data group is less than the minimum number of pieces of actual data.

12. The information processing apparatus according to claim 1, wherein
the processor further performs control to display a man-hour reduction rate on the basis of classification results obtained when the threshold is applied to the actual data group and on the basis of classification results obtained when an existing threshold different from the threshold is applied to the actual data group, the man-hour reduction rate being estimated when the threshold is applied in place of the existing threshold.

13. A non-transitory computer readable medium storing a program causing a computer to execute a process for information processing, the process comprising:
accepting input of a threshold of a confidence level indicating how confident a recognition result obtained by recognizing an image is,
when the threshold whose input is accepted is applied to an actual data group constituted by one or more pieces of actual data that are recognition results accumulated as actual performance results, classifying the actual data group by necessity of validation on the basis of a result of comparison between a confidence level in each of the one or more pieces of actual data in the actual data group and the threshold, and
performing control to display classification results obtained in the classifying,
wherein the classification results include:
a first result for at least one first piece of actual data that requires validation when the threshold is applied to the actual data group,
a second result for at least one second piece of actual data that requires no validation when the threshold is applied to the actual data group,
a third result for at least one third piece of actual data that requires validation when an existing threshold different from the threshold is applied to the actual data group, and
a fourth result for at least one fourth piece of actual data that requires no validation when the existing threshold is applied to the actual data group.

14. An information processing apparatus comprising:
means for accepting input of a threshold of a confidence level indicating how confident a recognition result obtained by recognizing an image is,
means for, when the threshold whose input is accepted is applied to an actual data group constituted by one or more pieces of actual data that are recognition results accumulated as actual performance results, classifying the actual data group by necessity of validation on the basis of a result of comparison between a confidence level in each of the one or more pieces of actual data in the actual data group and the threshold, and
means for performing control to display classification results obtained by the means for classifying the actual data group,
wherein the classification results include:
a first result for at least one first piece of actual data that requires validation when the threshold is applied to the actual data group,
a second result for at least one second piece of actual data that requires no validation when the threshold is applied to the actual data group,
a third result for at least one third piece of actual data that requires validation when an existing threshold different from the threshold is applied to the actual data group, and a fourth result for at least one fourth piece of actual data that requires no validation when the existing threshold is applied to the actual data group.

\* \* \* \* \*